(12) United States Patent
Südow et al.

(10) Patent No.: US 8,736,269 B2
(45) Date of Patent: May 27, 2014

(54) ELECTROMAGNETIC GEOPHYSICAL SURVEY SYSTEMS AND METHODS EMPLOYING ELECTRIC POTENTIAL MAPPING

(75) Inventors: Mattias Südow, Solna (SE); Frederick James Barr, Jr., Pearland, TX (US); Peter Lindqvist, Segeltorp (SE); Robert Juhasz, Stockholm (SE)

(73) Assignee: PGS Geophysical AS, Oslo (NO)

( * ) Notice: Subject to any disclaimer, the term of this patent is extended or adjusted under 35 U.S.C. 154(b) by 394 days.

(21) Appl. No.: 13/337,456

(22) Filed: Dec. 27, 2011

(65) Prior Publication Data

US 2013/0162255 A1    Jun. 27, 2013

(51) Int. Cl.
| | | |
|---|---|---|
| G01V 3/08 | (2006.01) | |
| G01V 3/00 | (2006.01) | |
| G01V 3/02 | (2006.01) | |
| G01V 3/12 | (2006.01) | |
| G01V 3/15 | (2006.01) | |

(52) U.S. Cl.
USPC ............ 324/337; 324/334; 324/357; 324/365

(58) Field of Classification Search
USPC ........................................................ 324/337
See application file for complete search history.

(56) References Cited

U.S. PATENT DOCUMENTS

| | | | |
|---|---|---|---|
| 4,617,518 | A | 10/1986 | Srnka |
| 7,132,831 | B2 | 11/2006 | Brabers |
| 7,191,063 | B2 | 3/2007 | Tompkins |
| 7,446,535 | B1 | 11/2008 | Tenghamn et al. |
| 7,453,763 | B2 | 11/2008 | Johnstad |
| 7,602,191 | B2 | 10/2009 | Davidsson |
| 7,671,598 | B2 | 3/2010 | Ronaess et al. |
| 7,834,632 | B2 | 11/2010 | Tenghamn et al. |
| 8,035,393 | B2 | 10/2011 | Tenghamn et al. |
| 2010/0017133 | A1 | 1/2010 | Ziolkowski |
| 2010/0045296 | A1 | 2/2010 | Tenghamn |
| 2010/0109671 | A1 | 5/2010 | Hobbs |
| 2011/0255368 | A1 | 10/2011 | Südow et al. |
| 2011/0260730 | A1 | 10/2011 | Südow et al. |
| 2011/0273179 | A1 | 11/2011 | Südow |

FOREIGN PATENT DOCUMENTS

| | | |
|---|---|---|
| EP | 2135115 | 10/2008 |
| EP | 2230535 A2 | 9/2010 |
| GB | 2479623 A | 10/2011 |
| WO | WO 02/14906 A1 | 2/2002 |
| WO | 2009003604 A3 | 1/2009 |

OTHER PUBLICATIONS

Neil Montomery, Examiner, United Kingdom Search Report for Application No. GB1223168.4, dated: Mar. 26, 2013.

(Continued)

*Primary Examiner* — Bot Ledynh

(57) ABSTRACT

The present disclosure describes various geophysical survey systems and methods for mapping an electric potential field. At least one illustrative embodiment includes an electromagnetic (EM) source and geophysical survey cables that each includes multiple electrodes spaced apart along each geophysical survey cable's length, and multiple data acquisition units that each obtains measurements indicative of an electric potential between two the electrodes. A calculation module is included and configured to combine signals representative of the measurements to produce signals indicative of the electric potential of each electrode relative to a reference potential assumed to be present at a selected electrode for each of the plurality of geophysical survey cables. Each reference potential is assumed to be of a magnitude that is within a tolerance range of a common reference potential.

31 Claims, 9 Drawing Sheets

(56) References Cited

OTHER PUBLICATIONS

Johan Mattsson, et al., "Error Analysis and Capability Modelling for Towed Streamer Electromagnetics," First Break, Aug. 2012, pp. 91-96, vol. 30.

Johan Mattsson, et al., "Towed Streamer EM: The Challenges of Sensitivity and Anisotropy" First Break. Jun. 2013, pp. 155-159, vol. 31.

Chris Anderson, et al., "An Integrated Approach to Marine Electromagnetic Surveying Using a Towed Streamer and Source" First Break, May 2010, pp. 71-75, vol. 28.

First Austrailian Patent Examination Report mailed on Dec. 23, 2013, in patent application No. 2012261759, 4 pages.

T. Eidesmo, S. Ellingsrud, L. M. MacGregor, S. Constable, M. C. Johansen, F. N. Kong, H. Westerdahl, Sea Bed Logging (SBL), a new method for remote and direct identification of hydrocarbon filled layers in deepwater areas, First Break, vol. 20, pp. 144-152, Mar. 3, 2002.

Constable, Steven, et al., "Mapping Thin Resistors and Hydrocarbons with Marine EM Methods: Insights from 1D Modeling", *Geophysics*, (Mar.-Apr. 2006), pp. G45-G51, vol. 71, No. 2.

Constable, Steven, et al., "An Introduction to Marine Controlled-Source Electromagnetic Methods for Hydrocarbon Exploration", *Geophysics*, (Mar.-Apr. 2007), pp. WA3-WA12, vol. 72, No. 2.

Newman, Gregory A., et al., "Imaging CSEM Data in the Presence of Electrical Anisotropy", *Geophysics*, (Mar.-Apr. 2010), pp. F51-F61 vol. 75, No. 2.

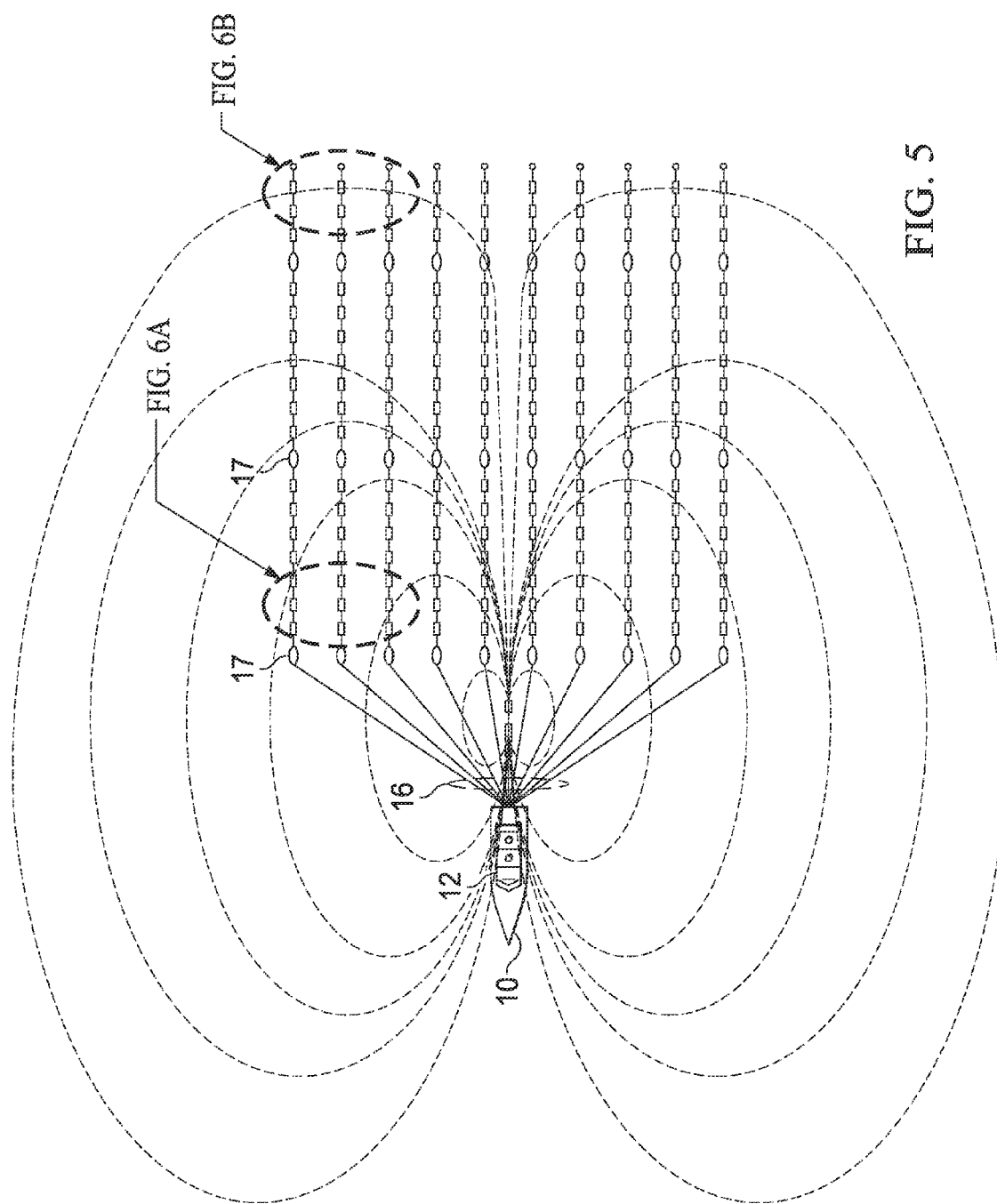

ELECTROMAGNETIC GEOPHYSICAL SURVEY SYSTEMS AND METHODS EMPLOYING ELECTRIC POTENTIAL MAPPING

CROSS-REFERENCE TO RELATED APPLICATIONS

This application is related to co-pending and commonly assigned application Ser. No. 13/337,696 titled "In-Line and Broadside Marine Electromagnetic Surveying", which application is incorporated by reference herein as if reproduced in full below.

BACKGROUND

Geophysical surveys provide data that can provide information about the structure and distribution of rock types and their contents. This information greatly aids searches for water, geothermal reservoirs, and mineral deposits such as hydrocarbons and ores. Most oil companies rely on geophysical surveys to select sites in which to drill exploratory oil wells.

One form of geophysical surveys, electromagnetic (EM) surveys, employ low frequency EM signals that interact with the strata of interest. Such signals may be transmitted from a geophysical source cable towed behind a ship or other surface or subsurface marine vessel travelling across a body of water such as a lake or ocean. The transmitted EM signals propagate through the water and the strata underneath the body of water. As the EM signals interact with the water and strata, the combined resistivity of the water and strata (and, to a lesser extent, the air above the water) causes the EM signals to decay as they propagate away from the source. The resulting electromagnetic field is thus a function of the resistive properties of the water, the sub-bottom strata, and the air. Differences in the strata resistivity along the survey line will translate into minute variations in this electromagnetic field.

Sensors along the length of a geophysical survey cable (which may also be towed by the ship) measure the strength of the electromagnetic field generated by the geophysical source cable, and this acquired data is used to identify and map resistivity contrasts of bodies within the strata (e.g., oil reservoirs). The geophysical survey cable typically obtains electric field measurements with electrodes spaced apart along the length of the cable, and as such, the geophysical survey cable only measures the component of the electrical field parallel to the cable (the "in-line component"). The electrical field component transverse to the survey cable (the "cross-line component") may offer additional information for mapping the resistivity contrasts, yet previous attempts to measure this component in a marine survey environment have proven inadequate. Given the importance of such maps, and the magnitude of the financial decisions that can depend upon them (e.g., whether to drill an exploration well at a particular location), there is significant incentive to improve their quality.

BRIEF DESCRIPTION OF THE DRAWINGS

Accordingly, there are disclosed in the drawings and the following description specific examples of electromagnetic geophysical survey systems and methods employing potential mapping to at least partly address this issue. In the drawings:

FIG. 5 is a top view of the illustrative geophysical survey system of FIG. 1.

Figure 1:
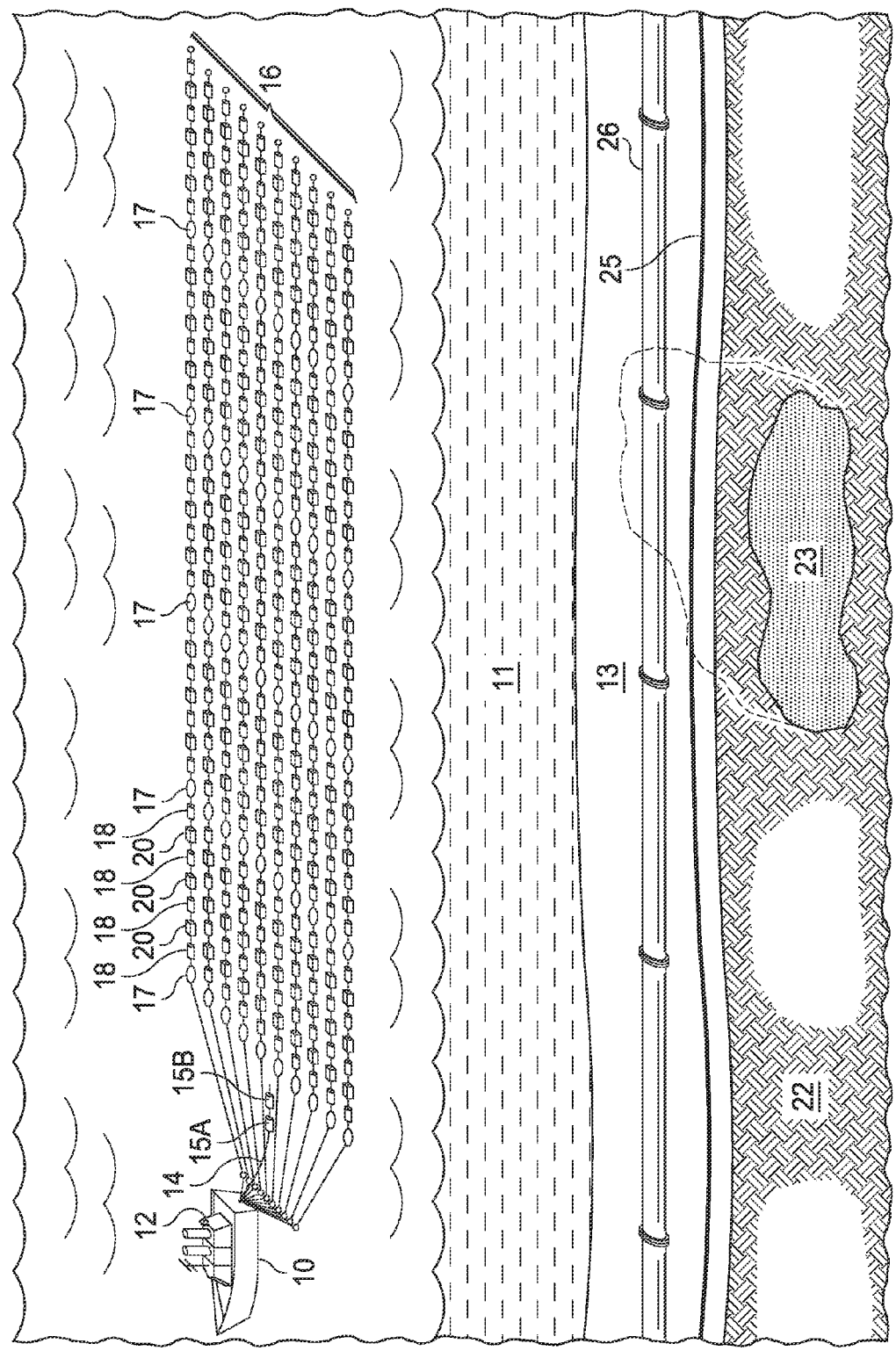
FIG. 1 is an isometric view of an illustrative geophysical survey system.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The paragraphs that follow describe illustrative geophysical survey systems and methods in more detail. First, we present an overview of an illustrative electromagnetic (EM) geophysical survey system to show the basic components of the system and their operation. This overview is followed by a more detailed description of some of the system components. An illustrative EM geophysical survey mapping method is presented, and an illustrative computer-based embodiment of the disclosed systems and methods is provided.

FIG. 1 shows an overview of an illustrative EM geophysical survey system operating in a marine environment. A marine vessel 10 travels through a body of water 11 and carries a geophysical recording system 12. One or more geophysical source cables 14 and two or more geophysical survey cables 16 are towed through body of water 11. (Though vessel 10 is shown towing both source and survey cables, other surveys may employ multiple vessels with one towing the geophysical survey cables and others towing geophysical sources.) A series of positioning devices 17 can be used to control the arrangement of source and survey cables.

Figure 2:
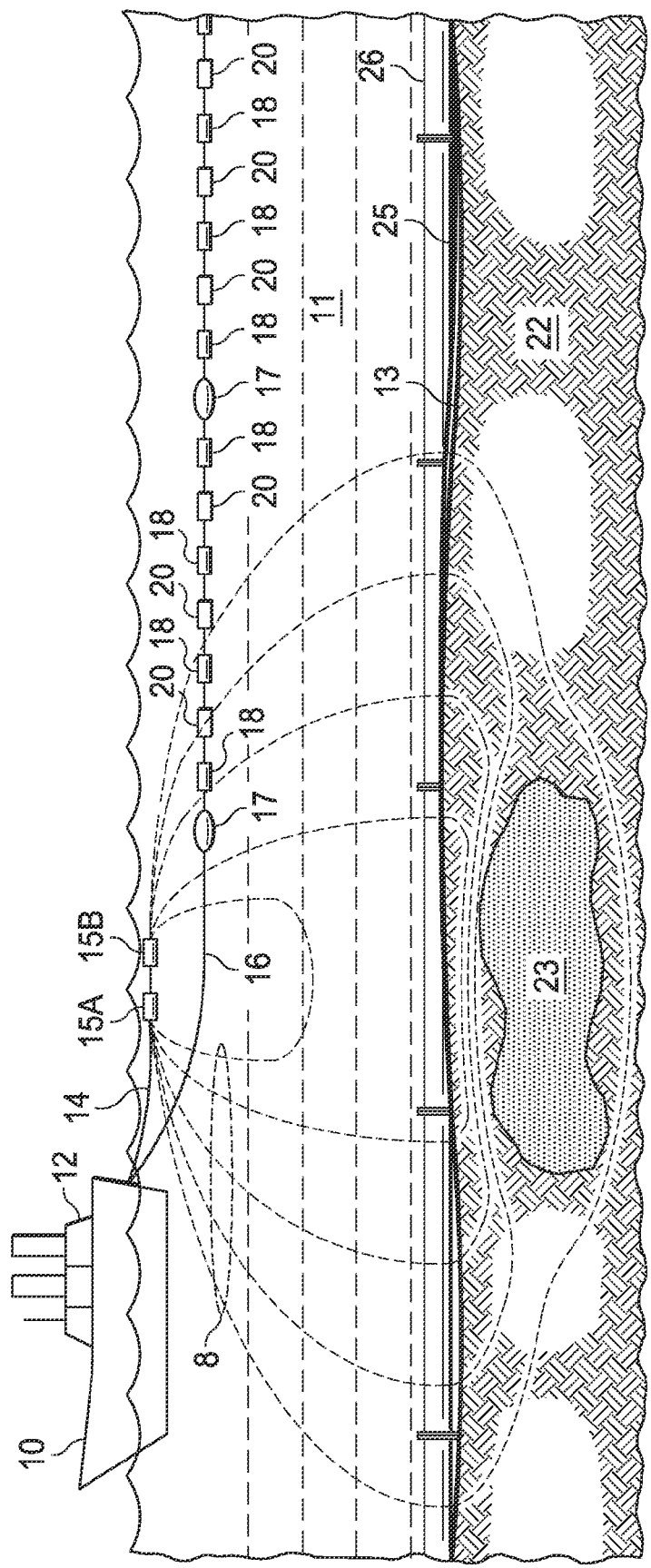
FIG. 2 is a side view of the illustrative geophysical survey system of FIG. 1.

Geophysical source cable 14 includes transmitting electrodes 15A and 15B, which cooperate to produce an electromagnetic (EM) signal 8 (e.g., a pulsed square wave at a frequency between 15 Millihertz and 5 Hertz) that propagates outward, permeating the surrounding water 11 and strata 22 and body 23 as illustrated in FIG. 2. As the EM signal 8 propagates, the varying resistivities of water 11, strata 22, body 23, and the air above the water each influence the strength of the fields created by EM signal 8. The lower the resistivity, the higher the rate at which the electric field amplitude decreases with distance. The lines shown in FIG. 2 represent regions where the electric field is of the same magnitude, with each line representing a different magnitude. As can be seen, variations in the field result from the differing resistivities. The electric field strength of EM signal 8 in the vicinity of a given point along geophysical survey cables 16 thus reflects the cumulative effect of the resistivity of water 11, strata 22 and body 23 (and to a lesser degree, the air above the water). Note that the geophysical survey cables 16 are illustrated for convenience in FIG. 2 as being parallel to the surface of water 11. In some embodiments, one or more geophysical survey cable 16 may not be parallel to the surface of water 11.

Figure 3:
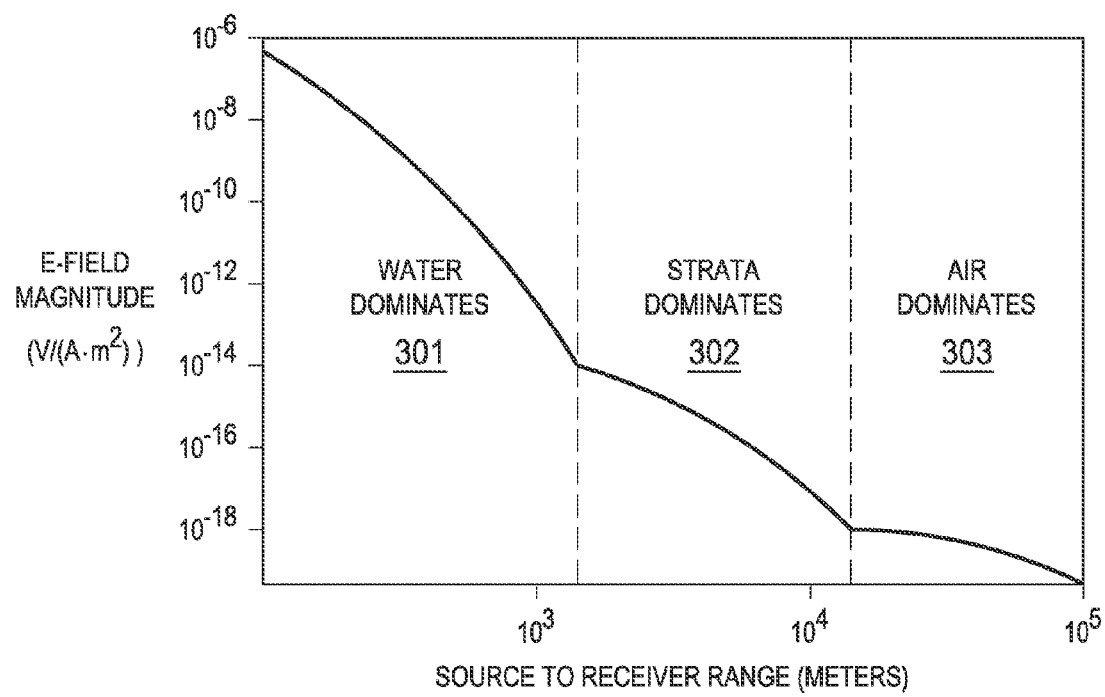
FIG. 3 shows the relative contributions of the strata, water and air resistivity to the decay of the electric field in one embodiment.

FIG. 3 shows a normalized electric field strength as a function of distance from the source in a typical survey environment. The log-log graph has been divided into three regions. Near the source (region 301 of the graph), the low resistivity of water 11 is the dominant factor in determining the magnitude of the electric field. In the intermediate region between about 1.2 km and 11 km (region 302), the dominant factor becomes the relatively higher resistivity of the strata. At longer distances (region 303), it is the air above the water that has the greatest effect on the electric field magnitude. Variations in the electric field strength different from those expected to be caused primarily by strata 22 are attributable to body 23, which enables body 23 to be detected, characterized and mapped.

Figure 4:
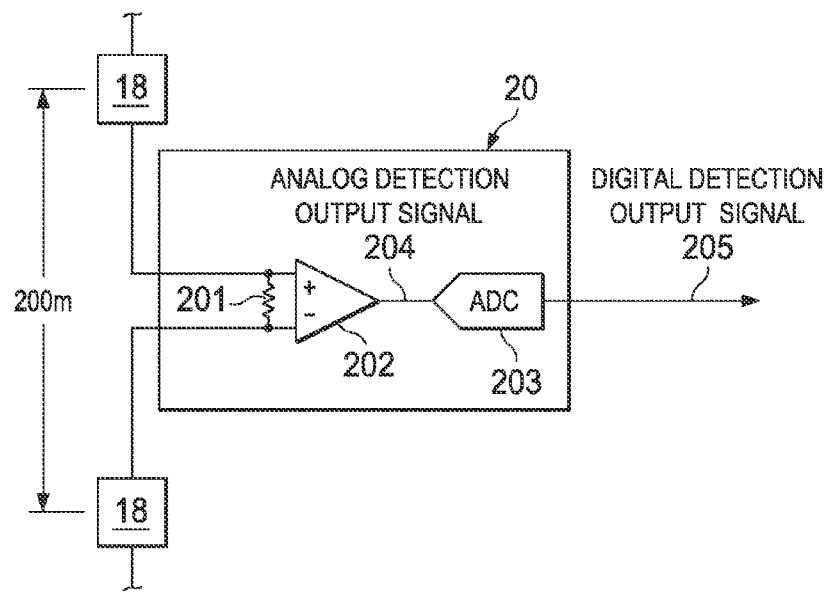
FIG. 4 shows an illustrative data acquisition module.

The geophysical survey cables 16 have pairs of electrodes 18 spaced along their length to detect and measure the electric potential created by EM signal 8. As illustrated in FIG. 4, each pair of electrodes may be spaced about 200 meters apart. Each electrode 18 is electrically exposed to the water through which it is towed. Each electrode pair may be coupled to the inputs of a differential amplifier 202, which may in at least some embodiments incorporate a shunt resistor 201 across the input nodes. The differential amplifier 202 enables data acquisition module 20 to convert the electric potential into a detection signal suitable for transmission to the geophysical recording system 12. While some survey system embodiments record the analog signal from differential amplifier 202, other embodiments include analog-to-digital (A/D) converters 203 that convert the analog signal to a digital signal for storage. The conversion can be done by data acquisition module 20 before the measurements are transmitted to the recording system 12, or in some cases, by the recording system 12 after the analog signal has been received. In the illustrative embodiment of FIG. 4, a digital detection signal 205 is transmitted back to geophysical recording system 12 for storage.

In the illustrated embodiment, the detection signals from the various data acquisition modules 20 are transmitted to recording system 12 via a communications backbone within each geophysical survey cable 16. Recording system 12 stores the data (analog and/or digital) for later processing, though some embodiments may provide real-time processing of the data. Such real-time processing enables the crew to adjust survey parameters as needed to ensure the quality of the acquired survey data.

Each geophysical survey cable 16 has multiple data acquisition modules (e.g., 5 modules per km of cable), and there are multiple geophysical survey cables 16 within the illustrative geophysical survey systems shown and described. The use of multiple geophysical survey cables 16 allows for the acquisition of more data over a larger area in a single pass by marine vessel 10. Such data, acquired concurrently over an area rather than a single straight line, may be used to generate 2D electric potential maps over an area and 3D electric potential maps over a volume, which in turn can be used to map out strata 22. In the illustrative embodiments disclosed, the measurements from electrodes on different geophysical survey cables 16 are correlated to each other by referencing each measurement to a common reference potential.

As explained further below, a common reference potential may be derived from measurements taken at or near the end of geophysical survey cables 16 due in part to the significant length of the survey cables. In at least some embodiments, each survey cable is approximately 8 km in length and is deployed so that the ends of the geophysical survey cables 16 are aligned as shown in FIG. 5. At such a significant distance from transmitting electrodes 15A and 15B, the electric field magnitude is small, making the electric potential relatively constant along a line that is transverse to the lengths of geophysical survey cables 16, particularly when compared with points nearer the source, where a similar transverse line would have stronger fields and more variation in the electric potential. This difference in electric potential geometries is illustrated in FIGS. 6A and 6B, which respectively show the contour lines for the electric field created by EM signal 8 at two different points near three of the geophysical survey cables 16.

Figure 6A:
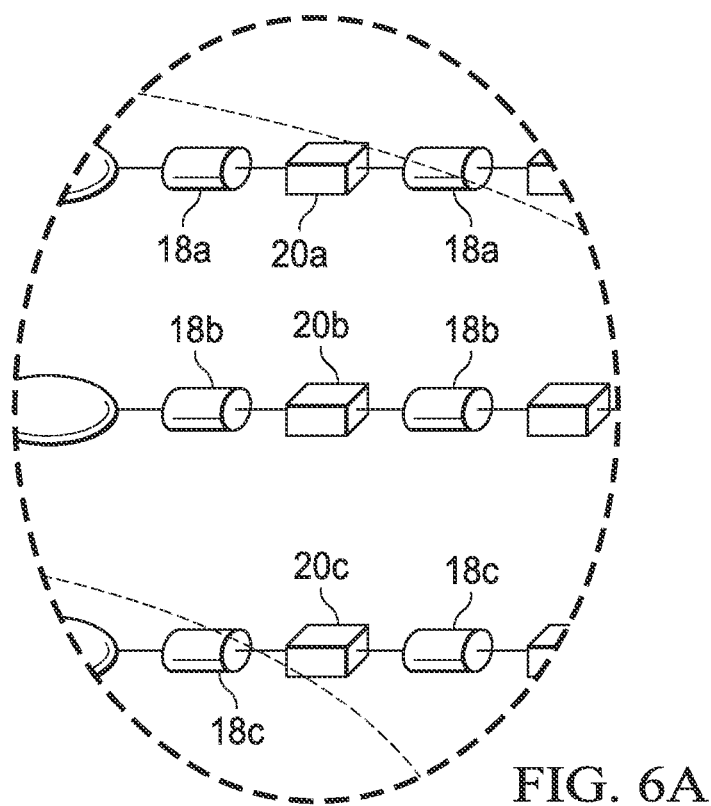
FIGS. 6A and 6B show the contours of the electric potential in different regions.

FIG. 6A illustrates the electric field at a point that is relatively close to transmitting electrodes 15A and 15B. Because of this proximity to the source of EM signal 8, the curvature of the electric field lines is relatively pronounced, and the electric potential measured at each set of electrodes varies significantly between individual cables. FIG. 6A illustrates an arrangement in which the magnitude of the electric potential at electrodes 18c will be greater than that at electrodes 18b, which in turn is greater than that at electrodes 18a.

Figure 6B:
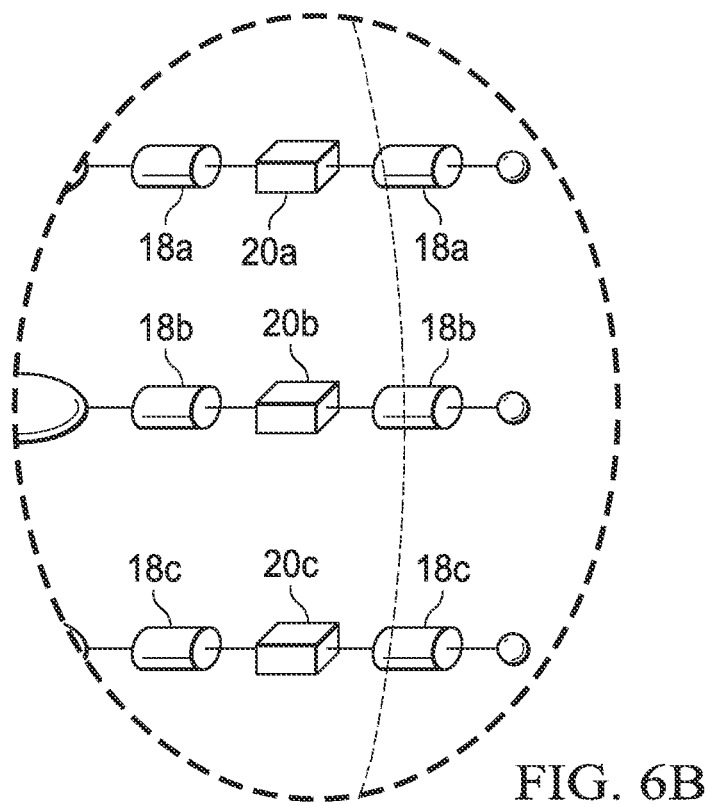

In FIG. 6B, by contrast, the curvature of the electric field contour lines at the ends of the cables (and hence further away from transmitting electrodes 15A and 15B), is almost flat and relatively uniform along a line transverse to the length of geophysical survey cables 16. Thus, the electric potential present at each of electrodes 18a, 18b and 18c is of a comparable magnitude. In at least some illustrative embodiments, this electric potential is assumed to be of the same magnitude at each electrode, while in other illustrative embodiments it is assumed to be of a different magnitude at each electrode within a tolerance range (e.g., within 1% of an assumed magnitude). As a result, measurements at these electrodes at the end of each geophysical survey cable 16 can be employed as a common reference potential against which the remaining measurements along the length of said geophysical survey cables 16 can be measured. While the example shown in FIGS. 6A and 6B only shows three of the geophysical survey cables, this approach may be applied to any number or all of the geophysical survey cables 16 of an illustrative embodiment of the disclosed geophysical survey system. Further, electrodes other than those at the end of each geophysical survey cable may be used, as long as the electric potential at each electrode is at, or with a tolerance range of, a common reference potential.

Figure 7:
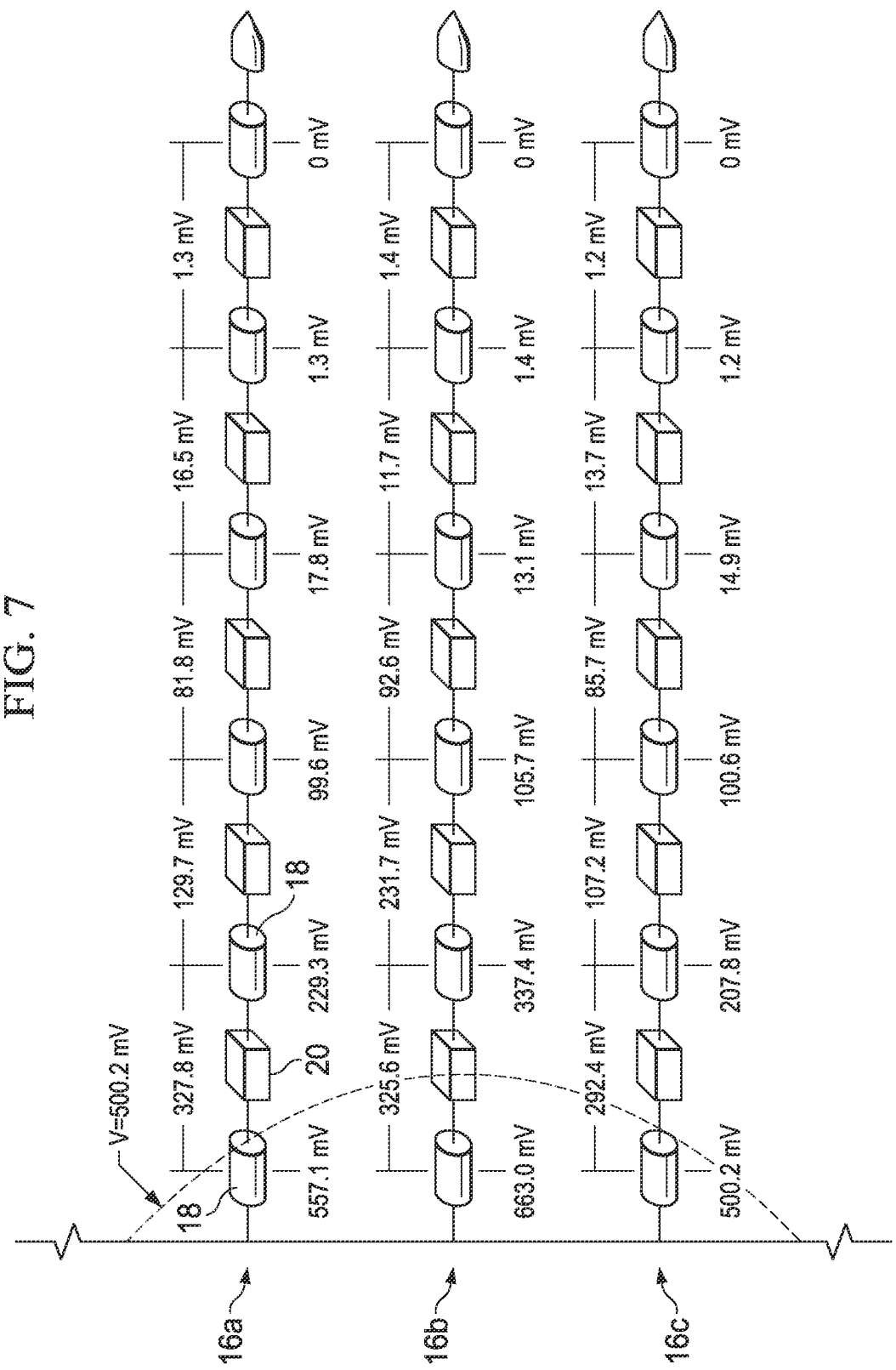
FIG. 7 shows an illustrative use of a common reference to obtain electric potential measurements.

To better understand how a common reference potential is used to correlate electric potential measurements taken by electrodes on different EM geophysical survey cables, an example is provided in FIG. 7, which shows a simplified system of three EM geophysical survey cables 16. Each electrode 18 from one electrode pair is shared with another electrode pair (except for electrodes at either end of each cable). This configuration enables differential measurements from each pair to be summed to determine the overall electric potential difference measured at any point on a given geophysical survey cable 16, relative to the end of each cable.

In the example shown in FIG. 7, the electric potential difference measurements along geophysical survey cable 16a are (in mV) 327.8, 129.7, 81.8, 16.5, and 1.3. When converted into potential measurements relative to the end electrode (which is assumed to be at zero), the potentials at the electrodes along geophysical survey cable 16a are (in mV) 557.1, 229.3, 99.6, 17.8, 1.3, and 0, respectively. Similarly, the illustrated electric potential difference measurements along geophysical survey cable 16b (325.6, 231.7, 92.6, 11.7, and 1.4 mV) translate into electrode potentials (in mV) 663.0, 337.4, 105.7, 13.1, 1.4, and 0, respectively. For geophysical survey cable 16c, the potential difference measurements 292.4, 107.2, 85.7, 13.7, and 1.2, translate into absolute potentials 500.2, 207.8, 100.6, 14.9, 1.2, and 0. Because the adjusted measurements are now all measured relative to a common reference potential, they can be compared and combined (e.g., subtracted from each other) to determine the cross-line component of the electric field between electrodes on two different survey cables. Of course, more sophisticated interpolation can be performed to model the electric potential based on the measured electrode potentials, e.g., a spatial filter can be used. By referencing all the differential measurements along each cable to a common reference potential, the instantaneous measurements of each of the cables can be used to derive and map out an instantaneous two-dimensional slice of the electric potential in a plane defined by the sensor cables. Additional cables may be positioned above or below the horizontal plane to enable a three-dimensional volumetric measurement of the instantaneous electric potential. As geophysical survey cables 16 are towed through the water, additional samples or "snapshots" provide additional measurements that provide redundancy (due to overlapping measurement regions) and new information (due to movement relative to the sub-surface structures). It should also be noted that in at least some illustrative embodiments, multiple snapshots are generated wherein each snapshot represents samples taken at one of multiple signal frequencies generated by the transmitting electrodes (e.g., transmitting electrodes 15A and 15B of FIG. 1). Electric potential field maps may subsequently be generated for each signal frequency.

The measurements taken via the electrodes at or near the end of geophysical survey cables 16 of the disclosed embodiments may be combined in any number of ways to produce a common reference potential. For example, least squares data fitting may be used to determine a common reference potential. In addition, or alternatively, standard deviation computations may be used to identify and exclude statistical outlier measurements. Boundary conditions, such as the Dirichlet boundary condition, together with an a priori knowledge of the electrical potential pattern, may also aid in deriving a common reference potential. Many such statistical techniques, mathematical operations and known conditions that may be applicable to the derivation of a common reference potential will be apparent to those of ordinary skill in the art, and all such techniques, operations and known conditions are within the scope of the present disclosure.

Figure 8A:
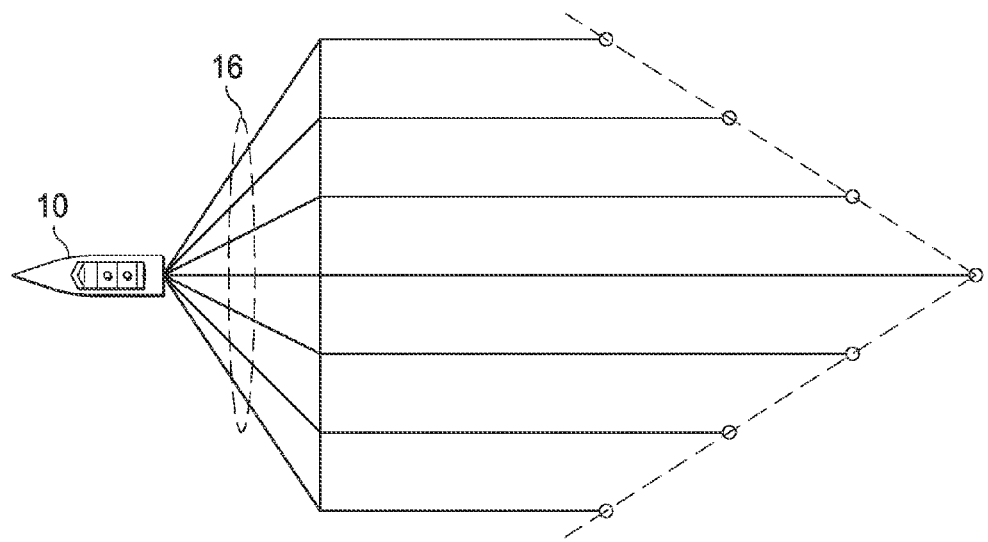
FIGS. 8A and 8B show illustrative survey cable electrode patterns.
Figure 8B:
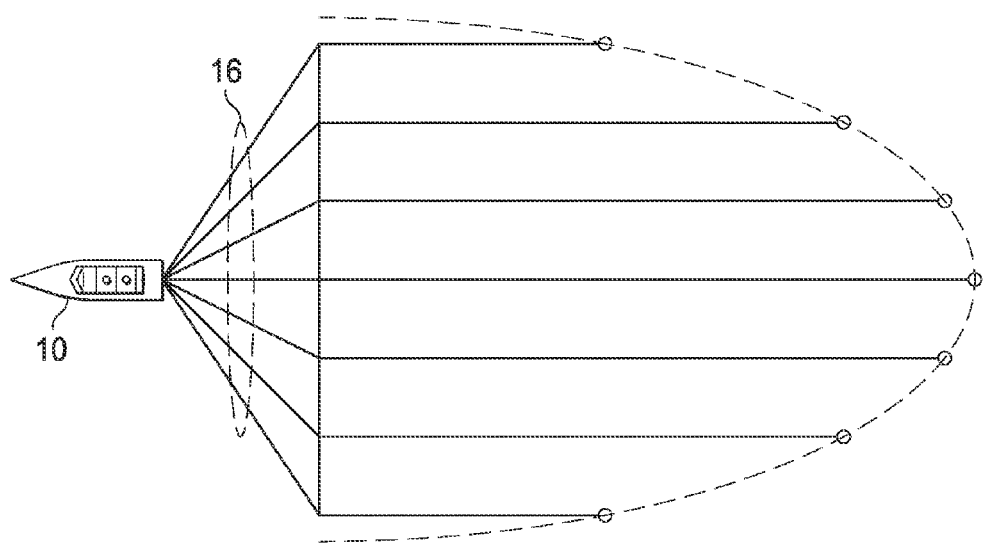

It should be noted that although the embodiment shown in FIG. 5 and described above have the ends of geophysical survey cables 16 aligned along a straight transverse line, other configurations of the survey cables are also within the scope of the present disclosure. For shorter survey cables spaced further apart, the effect of the curvature of the electric field lines of EM signal 8 may be enough to introduce significant and possibly unacceptable variations between the individual measurements at the electrodes at the end of each geophysical survey cable 16. In such situations, the positioning of each individual geophysical survey cables 16 may be selected such that the ends of each survey cable follow the expected curvature of the electric potential at the ends of the cables. For example, the ends of geophysical survey cables 16 may follow a line that is V-shaped or may trace a parabolic path, as shown respectively in the examples of FIGS. 8A and 8B. Many other survey cable geometries and configurations are possible, and all are within the scope of the present disclosure.

Figure 9:
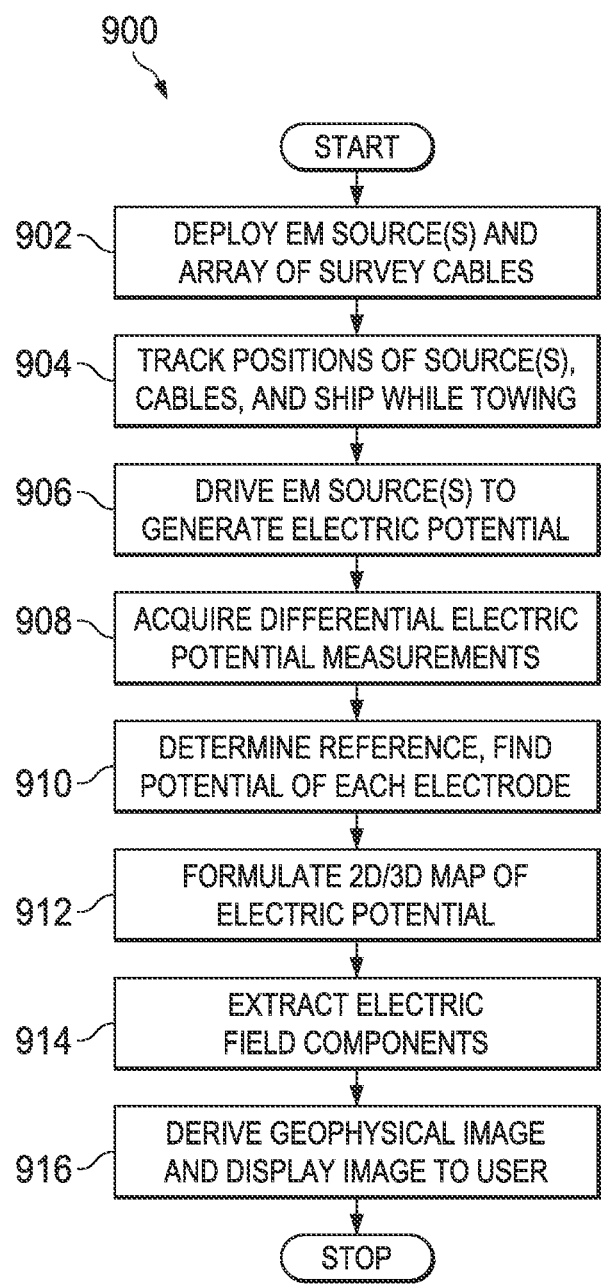
FIG. 9 shows an illustrative method for combining electric potential measurements.

In addition to the embodiments already described to illustrate just some of the possible system and apparatus implementations, illustrative methods are also disclosed herein that perform at least some of the functions disclosed above. FIG. 9 shows one such illustrative method 900, which begins with the deployment of the EM source and survey cables (block 902). The geographic position of the source is tracked as the cables are towed through the water by the ship (block 904), and the EM source is powered on to generate the electric potential (block 906). Differential electric potential measurements are acquired from the electrode pairs along the survey cables (block 908), which are correlated to the tracked geographic position of the source. In at least some illustrative embodiments, such position tracking and correlation is performed using a global positioning system (GPS), whereby the position of the ship is tracked and the positions of the electrodes on the geophysical survey cable are determined relative to the position of the ship. In other illustrative embodiments, the positions of elements along the length of the geophysical survey cable are tracked directly (e.g., using GPS receivers positioned along the length of the geophysical survey cable), rather than relative to the ship's position. Those of ordinary skill in the art will recognize that a wide variety of systems and methods may be used to determine the positions of the electrodes along the length of a geophysical survey cable, and all such systems and methods are within the scope of the present disclosure.

After determining a common reference potential, the potential for each electrode on each cable is determined relative to the common reference (block 910) for each set of acquired samples at a given geographic position, enabling a 2D and/or 3D map of the electric potential to be formulated (block 912). Corresponding electric field components are extracted from the electric potential map (block 914), from which a geophysical image (e.g., a geophysical survey map) is derived and displayed to the user (block 916), ending method 900.

Figure 10:
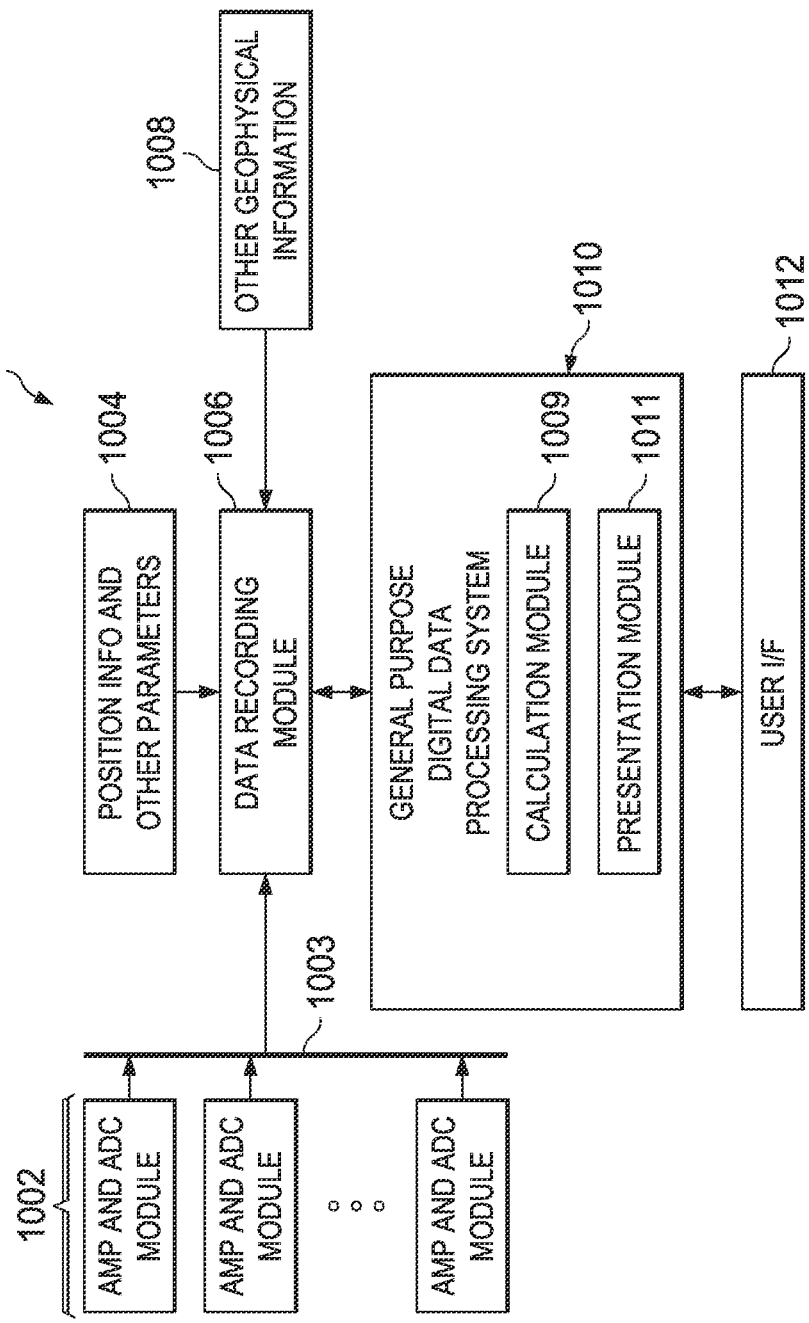
FIG. 10 shows an illustrative computer-based geophysical survey system.

The above-described method may be implemented as part of a data recording system 12, wholly or partially in software that executes on any of a wide variety of general purpose computers combined with some additional hardware, as shown in the illustrative embodiment of FIG. 10. Data is received by amplifier and analog-to-digital (A/D) modules 1002. This may be, for example, analog data provided by data acquisition modules that amplify the measured differential potential and transmit the amplified analog signal to data recording system 12 (similar, e.g., to data acquisition module 20 of FIG. 4, but without A/D 203). In other illustrative embodiments, amplifier and A/D module 1002 of FIG. 10 and data acquisition module 20 are one and the same, and it is the digital signals from the survey cables that are received by data recording module 1006, rather than a local digital signal from each of the amplifier and A/D modules 1002.

Data recording module 1006 stores the received digital data (representing the acquired data), position information and other related parameters (e.g., vessel speed), and other geophysical information (e.g., known general composition and properties of the strata and the surrounding water) for later retrieval and processing by software executing on general purpose digital data processing (GPDDP) system 1010. In at least some illustrative embodiments, the software executing on GPDDP system 1010 includes a calculation module 1009 that derives a common reference potential, and combines electrode measurements to determine electric potential field differences between different cables relative to the common reference potential. The calculation module further generates an electric potential field map over a volume from the electrode measurements and the electric potential field differences. The software also includes a mapping module that produces a geophysical survey map based on the electric potential field map and on the other data provided by data recording module 1006, and a presentation module 1011 that presents the geophysical survey map to the user as an image on either a video display or a printing device. Alternatively, the geophysical survey map data may be stored by data recording module 1006 for later presentation to the user.

It should be noted that some or all of the software modules described above may also be implemented as hardware modules. Such illustrative embodiments may be implemented using field programmable gate arrays or application specific integrated circuits, just to name two examples. In at least some illustrative embodiments, only some of the modules are implemented as hardware modules and are combined with GPDDP system 1010 executing software that includes the remaining software modules as part of data recording system 12.

The data provided by data recording module 1006 may also be processed by software executing on GPDDP system 1010 in real-time with the results stored on data recording module 1006 as well. Additional processing may still also be performed by the software executing on GPDDP system 1010 at a later time on the stored data. The software executing on GPDDP system 1010 may be controlled and monitored by a user from User I/F 1012, which can include such devices as a monitor, mouse and keyboard. In the illustrative embodiment of FIG. 10, both incoming data as well as processed data are displayed by User I/F 1012 (e.g., on a monitor), and the user controls the acquisition, processing and storage of the data from User I/F 1012.

It should be noted that GPDDP system 1010 may be implemented using any computer system or architecture, including but not limited to single processor systems, multi-processor systems, distributed architectures, stand-alone architectures, client/server architectures, mainframe architectures, workstations, blade servers, real machines, virtual machines and/or any combinations of all of these. Further, just as the hardware may organized as a distributed system, the software executing on GPDDP system 1010 may similarly be divided into modules and sub-modules that can be distributed across multiple hardware elements within GPDDP system 1010. Many other hardware and software systems, architectures and organizations will become apparent to those of ordinary skill in the art, and all such hardware and software system, architectures and organizations, as well as all combinations thereof, are within the scope of the present disclosure.

By acquiring and processing EM survey data as illustrated by the example embodiments shown and described, variations in the sampled electric potential field data can be processed, analyzed and interpreted to generate 2D and 3D geophysical survey maps of underwater strata. For example, by analyzing the variations in the generated field, the resistivity and location of contrasting bodies, and thus the composition of the corresponding formations, can be determined and incorporated into such geophysical survey maps. For a more detailed description of how geophysical survey data is used to produce survey images, see, e.g., Constable, et. al., *An Introduction to Marine Controlled-Source Electromagnetic Methods for Hydrocarbon Exploration* (Geophysics, Vol. 72, No. 2, pp. WA3-WA12, March-April 2007).

Numerous other modifications, equivalents, and alternatives, will become apparent to those skilled in the art once the above disclosure is fully appreciated. For example, although the described embodiments show survey cables towed at a single common depth, other illustrative embodiments include one or more survey cables that are towed at different depths, enabling the production of 3D electric potential field maps using at least some measurement data sampled across three dimensions. Also, although the described embodiments are shown being towed by a surface marine vessel, the use of the described systems and methods are not limited to towed survey cables, or even to marine environments. Rather, the described methods can also be applied to surface or ocean-bottom survey systems to correlate sensor data from multiple survey cables. It is intended that the following claims be interpreted to embrace all such modifications, equivalents, and alternatives where applicable.

What is claimed is:

1. An electromagnetic (EM) geophysical survey system that comprises:
    a plurality of geophysical survey cables each comprising a plurality of electrodes spaced apart along each geophysical survey cable's length;
    a plurality of data acquisition modules each configured to obtain measurements indicative of electric potential between two of the plurality of electrodes; and
    a calculation module configured to combine the measurements to produce one or more output signals indicative of the electric potential of each electrode relative to a reference potential assumed to be present at a selected electrode for each of the plurality of geophysical survey cables;
    wherein each reference potential is of a magnitude that is within a tolerance range of a common reference potential.

2. The EM geophysical survey system of claim 1, further comprising an EM source, wherein each selected electrode is furthest from the EM source for each of the plurality of geophysical survey cables.

3. The EM geophysical survey system of claim 1, wherein the tolerance range is set to zero and each reference potential is assumed to equal the common reference potential.

4. The EM geophysical survey system of claim 1, further comprising a presentation module configured to present a geophysical survey map to a user based at least in part on the one or more output signals.

5. The EM geophysical survey system of claim 1, wherein the plurality of electrodes are grouped into electrode pairs along each of the plurality of geophysical survey cables, and wherein each of the measurements are electric potential differences measured across one of the electrode pairs.

6. The EM geophysical survey system of claim 1, further comprising an EM source, wherein the calculation module combines the measurements by summing the measurements acquired at the electrode pairs between a given electrode and the end furthest from the EM source of the given electrode's geophysical survey cable.

7. The EM geophysical survey system of claim 1, wherein the calculation module is further configured to compute the electric potential difference between two electrodes that are each on two different geophysical survey cables of the plurality of geophysical survey cables.

8. The EM geophysical survey system of claim 1, wherein the calculation module is further configured to combine the one or more output signals to formulate an electric potential map.

9. The EM geophysical survey system of claim 8, wherein the electric potential map is formulated over an area or over a volume.

10. The EM geophysical survey system of claim 8, further comprising a mapping module that generates a geophysical survey map based at least in part on the electric potential map.

11. The EM geophysical survey system of claim 10, wherein the mapping module further provides data representing the geophysical survey map to the presentation module for presentation to the user.

12. The EM geophysical survey system of claim 10, further comprising a data recording module, wherein the mapping module further provides data representing the geophysical survey map to the data recording module for storage and later presentation to the user by the presentation module.

13. The EM geophysical survey system of claim 1, wherein the calculation module is implemented at least in part in hardware or at least in part in software.

14. The EM geophysical survey system of claim 1, wherein the input signals and the one or more output signals each comprises a digital signal or an analog signal.

15. The EM geophysical survey system of claim 1, wherein the calculation module performs at least part of the combination of the measurements in real-time.

16. The EM geophysical survey system of claim 1, further comprising a data recording module, wherein the measurements are stored by the data recording module for later processing by the calculation module.

17. The EM geophysical survey system of claim 1, wherein the calculation module further combines the electric potential at each selected electrode to determine the common reference potential.

18. An electromagnetic (EM) geophysical survey method that comprises:
    acquiring measurements indicative of electric potential between two of a plurality of electrodes spaced apart along each of a plurality of geophysical survey cables; and
    combining the measurements to determine the electric potential of each electrode on each geophysical survey cable relative to a reference potential assumed to be present at a selected electrode for each of the plurality of geophysical survey cables;
    wherein each reference potential is of a magnitude that is within a tolerance range of a common reference potential.

19. The EM geophysical survey method of claim 18, further comprising activating an EM source, wherein each selected electrode is furthest from the EM source for each of the plurality of geophysical survey cables.

20. The EM geophysical survey method of claim 18, wherein the tolerance range is set to zero and each reference potential is assumed to equal the common reference potential.

21. The EM geophysical survey method of claim 18, further comprising presenting a geophysical survey map to a user based at least in part on the electric potentials determined for each electrode.

22. The EM geophysical survey method of claim 18, further comprising grouping the plurality of electrodes into electrode pairs along each of the plurality of geophysical survey cables, wherein the acquiring of the measurements comprises measuring electric potential differences across one of the electrode pairs.

23. The EM geophysical survey method of claim 18, further comprising activating an EM source, wherein the combining of the measurements comprises summing the measurements acquired at the electrode pairs between a given electrode and the end furthest from the EM source of the given electrode's geophysical survey cable.

24. The EM geophysical survey method of claim 18, further comprising computing the electric potential difference between two electrodes that are each on two different geophysical survey cables of the plurality of geophysical survey cables.

25. The EM geophysical survey method of claim 18, wherein the acquiring of measurements comprises combining the measurements in real-time, or storing the data for the later combining of the measurements.

26. The EM geophysical survey method of claim 18, further comprising towing the plurality of geophysical survey cables across a body of water.

27. The EM geophysical survey method of claim 18, further comprising formulating an electric potential map from the electric potentials determined from the combining of the measurements.

28. The EM geophysical survey method of claim 27, further comprising formulating the electric potential map over an area or over a volume.

29. The EM geophysical survey method of claim 27, further comprising generating a geophysical survey map based at least in part on the electric potential map.

30. The EM geophysical survey method of claim 18, further comprising presenting the geophysical map to the user in real time, or storing data representing the geophysical map for later presentation to the user.

31. The EM geophysical survey method of claim 18, further comprising producing the common reference potential by combining the potential at each selected electrode.

* * * * *